United States Patent [19]

Giers et al.

[11] Patent Number: 4,512,671
[45] Date of Patent: Apr. 23, 1985

[54] BALANCING MACHINE BEARING MOUNTING FOR FLEXIBLE ROTORS

[75] Inventors: Alfred Giers, Rossdorf; Manfred Heiland, Darmstadt-Neu-Kranichstein, both of Fed. Rep. of Germany

[73] Assignee: Carl Schenck AG, Fed. Rep. of Germany

[21] Appl. No.: 452,967

[22] Filed: Dec. 27, 1982

[30] Foreign Application Priority Data

Dec. 24, 1981 [EP] European Pat. Off. ........... 81110778

[51] Int. Cl.³ .............................................. F16C 27/00
[52] U.S. Cl. ..................................... 384/215; 384/428
[58] Field of Search ................ 384/129, 99, 215, 114, 384/428, 441, 442, 443, 444; 308/178; 318/460; 73/593

[56] References Cited

U.S. PATENT DOCUMENTS

| | | | |
|---|---|---|---|
| 3,679,272 | 7/1972 | Costa et al. | 384/99 |
| 3,746,409 | 7/1973 | Heiland | 384/215 |
| 3,754,801 | 8/1973 | Giers et al. | 384/428 |
| 4,193,644 | 3/1980 | Miyashita et al. | 384/107 |
| 4,381,128 | 3/1983 | Vohr | 384/99 X |

FOREIGN PATENT DOCUMENTS

| | | | |
|---|---|---|---|
| 963714 | 7/1964 | United Kingdom | 384/215 |
| 703690 | 12/1979 | U.S.S.R. | 384/428 |
| 842299 | 7/1981 | U.S.S.R. | 384/428 |

OTHER PUBLICATIONS

Schenck Brochure, Vibration Measuring Equipment, Publication No. A 1076, Jan., 1971.
Schenck Brochure, Vibration Exciters, Publication No. S 7057, Mar., 1972.

Primary Examiner—John Petrakes
Assistant Examiner—David Werner
Attorney, Agent, or Firm—Connolly and Hutz

[57] ABSTRACT

In a bearing mounting for flexible rotors there are provided bearing heads for the journals of the flexible rotors and a foundation to support such bearing heads. For the purpose to influence the natural frequency of the combined system rotor - rotor support which is dependent also on the support stiffness it is desirable to change the support stiffness in the simplest possible manner in such a way that starting from the effects of the flexible rotor to be treated on the signal pick-ups, a control and/or closed loop control of counter-effects is possible to find the balancing quality of a flexible rotor independent of the present support stiffness.

8 Claims, 2 Drawing Figures

BALANCING MACHINE BEARING MOUNTING FOR FLEXIBLE ROTORS

BACKGROUND OF THE INVENTION

The invention concerns a balancing machine bearing mounting for flexible rotors in which the mountings are provided with bearing heads for the journals of the flexible rotors and a foundation to support such bearing heads.

Balancing machines for flexible rotors present a problem in that the natural frequencies of the unit consisting of the flexible rotor and bearing support are also dependent on the stiffness of the bearings in the balancing machine. Thus, it is desirable that the bearing stiffness be adjusted in the simplest possible manner within wide ranges.

For this purpose, a substantially rigid bearing mounting for a rotating body is known (U.S. Pat. No. 3,754,801) with support for each bearing location by means of a spring bar system located in a plane perpendicular to the main bearing axis. The overall system consists of spring bars, inflexible to tension, compression and buckling but consisting, in one or several sections, of spring bars which are flexible to bending and which secure the bearing housing against rotational movement around the main axis of the bearing and provide equally hard support against the machine base in all radial directions. On the other hand, this arrangement permits tumbling motions of the rotational axis of the rotating body around two axes, perpendicular to one another through the center point of the support location. An additional device is provided for purposes of tuning the oscillatory system of the test body plus bearing support, namely in such a form that additional supports are solidly anchored on one side, spring actuated and positively locked to the machine base, and connected at the other end to the bearing housing for intermittent tuning, namely via a friction connection, which can be remotely controlled and which obstructs the tumbling motions of the bearing housing as little as possible. Although such a bearing mounting for a balancing machine permits adjustment of the spring stiffness of the bearings, it is not suitable for direct reaction to the stresses emanating from the rotor to be investigated, even though, as is disclosed in this patent, a remote control is arranged for the friction connection that is provided. Nor is it suitable in order to obtain continuous selection of values for spring stiffness and damping.

SUMMARY OF THE INVENTION

On the basis of the above prior art, the purpose of the present invention is to change the bearing stiffness of a balancing machine within wide ranges and, if required, the damping thereof as well, for purposes of testing flexible rotors, particularly with respect to their balancing qualities. According to the invention, this problem is solved whereby that in order to determine the movements of bearing head and/or bearing journal, at least one measuring device is provided per bearing journal resting in a bearing, that the measurement signal from the measurement device acts upon at least one signal transformer, and that at least one power source induces corresponding forces in predetermined proportions at the bearing heads and/or bearing journals.

The problem upon which the invention is based can also be solved in such a manner that, in order to determine the movement of bearing head and/or bearing journal, at least one measurement device per bearing journal is provided to determine its support forces. The measurement signal from the measurement device acts upon at least one signal transformer, and at least one power source induces corresponding forces in predetermined proportions at the bearing heads and/or bearing journals. These inventive solutions of the problem describe an active balancing machine bearing mounting, whereby, on the basis of those effects of the flexible rotors to be investigated which act upon measurement transformers, it is possible to achieve an adjustment and a control of counter-effects in order to determine the balance qualities of a flexible rotor to be investigated, independently of a given bearing stiffness, and, on the whole, to achieve a selection of spring and damping characteristics of the support. This makes it possible, on one hand, to achieve a balancing condition which is largely independent of the bearing conditions, and, on the other hand, to avoid dangerous conditions in case of approaching resonance or instability, and furthermore, it will be possible to make investigations into the principles of the rotor behavior with variable bearing characteristics.

Absolute and relative pickups can be equally well applied as measurement devices for the movement of bearing head and/or bearing journal, deriving the measurement values of the movement from the displacement, from the velocity, or from the acceleration of the bearing head and/or the bearing journal. To determine the effects of forces, strain gauges, or oil pressure, are used as relative recorders. For simultaneous determination of the measurement values from bearing head and bearing journal, it is preferable, according to the invention, that the measurement values for the bearing journals are obtained by non-contacting probes for the bearing journal against the bearing head, while the measurement values for the bearing head are determined as absolute values.

The measurement values obtained in this manner are fed to a signal transformer, which now, accordingly, generates forces with predetermined proportionality. Hereby, the reactive forces may have an absolute effect, i.e., be attached to the bearing head, if it is a question of rotating or oscillating vibrators, or, they may occur as forces with relative effect, if hydraulic pistons, piezovibrators, or magnetostrictive vibrators are applied. If magnet vibrators are used, they can also be located on the bearing journal. Thus, the bearing mounting for a balancing machine according to the invention allows control of the bearing stiffness in dependence of the rotor to be investigated, as well of its damping, either combined or individually. This also makes it possible to immediately influence critical conditions triggered during the acceleration to the rate of speed of measurement or at the measurement speed proper, either due to resonance phenomena between the rotor under investigation and the bearing mounting, or to the critical speed of the rotor, namely to such an extent that destruction of the balancing machine bearing mounting is definitely avoided.

BRIEF DESCRIPTION OF THE DRAWINGS

Novel features and advantages of the present invention in addition to those noted above will become apparent to those persons skilled in the art from a reading of the following detailed description in conjunction with the accompanying drawings wherein.

DETAILED DESCRIPTION OF THE INVENTION

Figure 1:
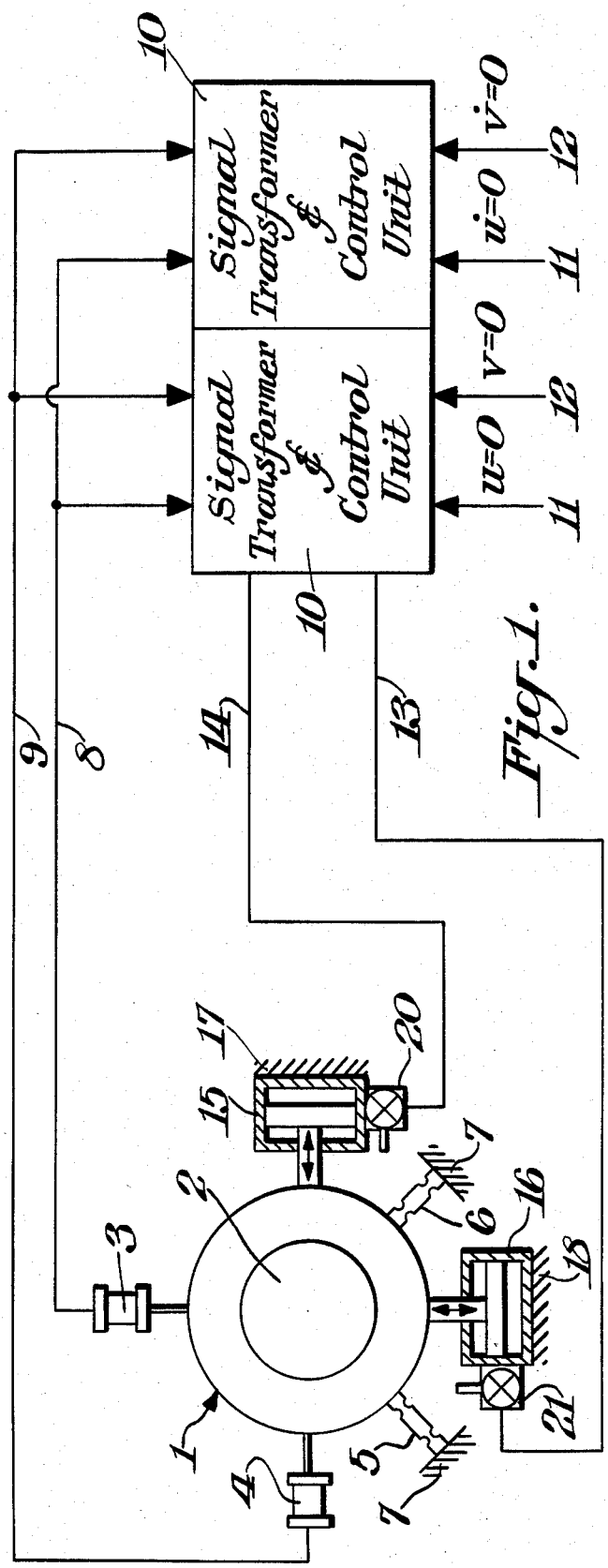
FIG. 1 is a schematic diagram of a balancing machine bearing mounting, according to the present invention.

The invention is explained in greater detail with reference to a schematically illustrated balancing machine bearing mounting for one bearing location of a flexible rotor to be investigated. However, the invention is not limited to the individual bearing location represented in the execution example, since if the flexible rotor to be investigated should have multiple bearing locations, the other bearing locations are executed in the same manner. Furthermore, the process control according to the invention can be achieved with all mentioned measurement devices with absolute and relative effect as well as with all power sources with absolute and relative effect, for instance, if the recorder proper makes it possible, by itself or in conjunction with a bearing, to measure the movement of the flexible rotor.

In addition, the execution example clarifies only the movement of a bearing head by means of a measuring device and further processing of the signals obtained there, but not the movement of a bearing journal by itself or in conjunction with the measurement of the movement of the bearing head.

A first movement device 3 and a second measurement device 4 are located on a bearing head 1, by which is supported a bearing journal 2 for the flexible rotor, e.g., commercially available friction bearing. In the present case, it is assumed, that these are measurement devices with absolute effect, such as described, for example, in the brochure Schenck, Vibration Measuring Equipment, Publication No. A 1076. The bearing head 1 itself is connected with a base 7 by means of springs 5, 6. The base may be the bearing bed of a balancing machine which is not represented.

When the bearing journal 2 rotates, the first measurement device 3 and the second measurement device 4 generate measurement signals which are variable as to time due to the rotation of the rotational body. However, the measurement signals may also contain a constant component if displacement recorders are used, which react to static dislocations.

Via measurement lines 8, 9, the signals generated by the first measurement device 3 and the second measurement device 4 are fed into a signal transformer and control unit 10. If required, the signals may be influenced here, by means of integration or differentiation over time, so that, for example, signals proportional to displacement and velocity will be available in parallel. However, each measurement device may also—as shown in the figure—contain two systems, which produce speed proportional and displacement proportional signals in parallel. Furthermore, if desired, signals from several measurement devices may be mixed in the signal transformer and control unit in order to obtain the desired effects.

The signals obtained in this manner generally represent the actual values of the displacement and/or the velocity at the measurement points. The signals are then fed into a control unit and compared with reference values 11, 12 which are assumed, as an example, to represent 0 in FIG. 1 for displacement and velocity. By way of explanation, the expression u is the abbreviation for a specified displacement in one measurement direction, v is the abbreviation for the other specified displacement in the other measurement direction, and u, v represent the time derivations, i.e. the velocity in the respective measurement directions. If desired, the difference between actual values and reference values multiplied with a proportionality factor, are then fed via control lines 13, 14, to hydraulic devices 15, 16 which are arranged at right angles to one another, namely according to the common rules of control technology. The control lines 13, 14 contain the information concerning desired damping and stiffness (e.g. the signal portion proportional to displacement or velocity) so that the hydraulic devices 15, 16 can be acted upon by proportional stiffness and/or proportional damping as selected. As relative power sources, the hydraulic devices 15, 16 rest against supports 17 and 18, respectively. Also, the supports 17 and 18 may constitute the foundation for the balancing machine. The oil supply, which is not represented in the drawing, is correspondingly controlled by means of control valves 20, 21.

Figure 2:
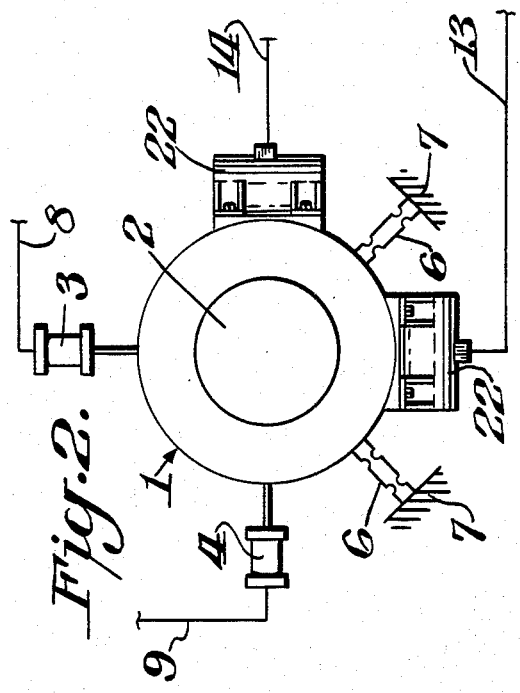
FIG. 2 is a schematic diagram of another balancing machine bearing mounting, according to the present invention.

Instead of the supports 17 and 18, absolute power sources may be located directly at the bearing head 1, namely as represented by rotating vibrators or oscillating vibrators 22, as shown in FIG. 2. For this purpose, it is then only required to connect the control lines 13 and 14 to the vibrators as shown. Such vibrators are described in the brochure Schenck Vibration Exciters, Publication No. S 7057.

If the hydraulic device 15, 16 is utilized, it is to be considered an inventive execution that thick-walled cylinders which extremely short stroke are utilized there, which cylinders are very rigidly supported. Thereby, one obtains extremely high degree of oil spring stiffness, so that both stiffness and damping of the bearing head 1 can be adjusted in a practically linear manner.

A preferred embodiment of the invention is to install in a radial plane through each bearing the measurement devices of a right angle to one another and also to install the power sources at a right angle to one another.

We claim:

1. A balancing machine bearing mounting for flexible rotors with bearing heads for bearing journals of the flexible rotors and a foundation for supporting the bearing heads, characterized thereby that at least one measuring device per bearing journal is connected to the bearing head for determining the movement of the bearing head and/or bearing journal and generating a signal representative of that movement, means transmitting the measurement signal from the measurement device to a signal transformer for comparing the measurement signal with a reference value and generating a signal representative of that comparison, at least one power source connected to the bearing head, and means transmitting the comparison signal to the power source for inducing corresponding forces with given proportionality to the bearing heads and/or bearing journals.

2. A balancing machine bearing mounting for flexible rotors with bearing heads for bearing journals of the flexible rotors and a foundation for supporting the bearing heads, characterized thereby that at least one measuring device per bearing journal is connected to the bearing head for determining the movement of the bearing head and/or bearing journal and generating a signal representative of its force, means transmitting the measurement signal from the measurement device to a signal transformer for comparing the measurement signal with a reference value and generating a signal representative of that comparison, at least one power source connected to the bearing head, and means transmitting the comparison signal to the power source for inducing corresponding forces with given proportionality to the bearing heads and/or bearing journals.

3. A balancing machine bearing mounting as in claim 1 including two measuring devices and two power sources per bearing journal, the devices being connected to the bearing head at a right angle to one another, the power sources also being connected to the bearing head at a right angle to one another, and the transmitting means comprising two lines, one line interconnecting one measuring device with one power source via the signal transformer and the second line interconnecting the other measuring device and the other power source via the signal transformer.

4. A balancing machine bearing mounting as in claim 3 wherein each power source comprises a hydraulic device.

5. A balancing machine bearing mounting as in claim 3 wherein each power source comprises a vibrator device.

6. A balancing machine bearing mounting as in claim 2 including two measuring devices and two power sources per bearing journal, the devices being connected to the bearing head at a right angle to one another, the power sources also being connected to the bearing head at a right angle to one another, and the transmitting means comprising two lines, one line interconnecting one measuring device with one power source via the signal transformer and the second line interconnecting the other measuring device and the other power source via the signal transformer.

7. A balancing machine bearing mounting as in claim 6 wherein each power source comprises a hydraulic device.

8. A balancing machine bearing mounting as in claim 6 wherein each power source comprises a vibrator device.

* * * * *